R. L. Nelson.

Life Preserver.

No 893. Reissued Feb. 7, 1860.

Witnesses.

Thos. H. Upperman.
J. Kirsch

Inventor.

Richard L. Nelson
per atty, A. B. Stoughton

UNITED STATES PATENT OFFICE.

RICHARD L. NELSON, OF OCALA, FLORIDA.

IMPROVED MODE OF ATTACHING LIFE-PRESERVERS TO VESTS.

Specification forming part of Letters Patent No. 11,969, dated November 21, 1854; Reissue No. 893, dated February 7, 1860.

*To all whom it may concern:*

Be it known that I, RICHARD L. NELSON, of Ocala, in the county of Marion and State of Florida, have invented a new and useful Improvement in Life-Preservers, to be Used with Vests and other Garments; and I do hereby declare the following to be a full, clear, and exact description of the construction of the same and its mode of application to a vest or other similar body garment, reference being had to the accompanying drawings, making a part of this specification, in which—

Figure 1:
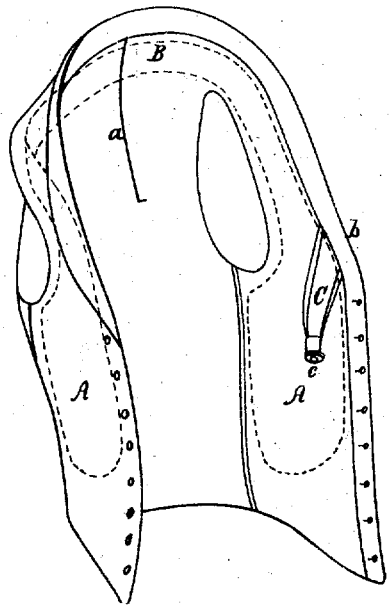
Figure 2:
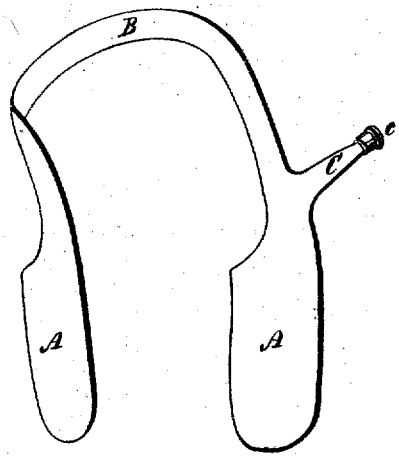
Figure 3:
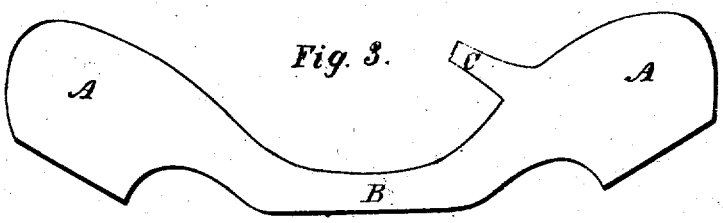

Figure 1 represents a vest with the life-preserver applied to it. Fig. 2 represents the life-preserver removed from the vest, and Fig. 3 represents the form or shape of the pieces of prepared-rubber material, out of which the air bags or pads are formed.

I am aware that life-preserving garments of many kinds have been used, and that air bags or pads have been permanently attached to vests; but my invention differs materially from these things. It is not a life-preserving garment, nor yet a permanently-attached air-bag to a vest or garment that I claim to have invented.

My invention relates to an air bag or pad so made as that it can be applied to, worn with, or removed from a vest or other similar garment without disturbing any of the seams of said garment. In the use of my invention it is not necessary that a special garment should be purchased with it, for it can be applied to any vest already made, and can be changed from one ordinary vest to another. It is removable from and applicable to any vest, and the vest can be worn with or without the air bags or pads at pleasure.

To use my invention it is only necessary to buy the bag or pad, and any vest will receive it, and any one can apply it to the vest.

There are many objections to the life-preservers in ordinary use. Those that are fastened around the waist of a person raise the body so high out of the water as to prevent the free use of the limbs; besides they are liable to be torn off or reverse their positions. And those which have permanent air-chambers in them cannot be worn with any degree of comfort as an every-day article of dress, and from this cause are always to be hunted up when an emergency requires their use.

With a view of remedying these objections I have devised my plan of making and using life-preservers; and my invention consists, first, in so constructing an air bag or pad as that it may be introduced between the facing and lining of a vest or other garment without disturbing any of the seams of said garment, or be as readily removed therefrom when not required to be worn with a vest or other garment; and, secondly, my invention consists in forming an inflating-channel for filling the bag with air without forming a seam in the bag or pad where it is located; or, in other words, cutting out the pieces of which the bag or pad is composed so that when the two are cemented around their edges the tube or channel through which the bag is to be inflated will be made or formed by the continuation of the sides or walls of the bag or pad, and not have a cemented or any other artificial connection or attachment thereto, which is so liable to give way or leak out the air.

To enable others skilled in the art to make and use my invention, I will proceed to describe the same with reference to the drawings.

The pieces of prepared rubber or vulcanized-rubber cloth, of which the life-preserving bag is to be composed, are cut out in the form substantially as shown in Fig. 3, so that there will be, when said two pieces are cemented at their edges, (in the common well-known way,) two bags or pads, A A, and a connecting channel or passage, B, between them, and also an inflating tube or channel, C. The so cutting out of the pieces of which the bags or pads are made as to allow the tube or channel C to be a part of the bag or pad is doubly important. It saves the expense of cementing a tube to the bag, but, above all, it makes a strong, reliable connection, which is not liable to be torn off, and will not allow the air to escape, as the cemented tubes do. The tube or channel C is an indispensable part of the life-preserver, and should be long enough to extend from the breast of the vest or garment to the mouth of the wearer, so that it can be inflated when on his body.

In Fig. 2 I have shown the form that the life-preserver assumes when placed in the garment or when worn on the body, the part B passing over the shoulders or behind the body of the wearer, while the bags A will come forward and buoy up the chest and body.

The manner of applying this life-preserver is as follows: Take any ordinary vest or other similar body-garment, as usually made, and cut a slit, *a*, in the back of the lining. Also, cut another slit, *b*, in the lining of the front of the vest for the inflating-tube to pass through. Pass the bags A A into the slit *a*, one to the right, the other to the left, and between the lining and facing of the garment. Draw the tube C, when the preserver is to be inflated, through the slit *b*, and inflate the chambers of the bag. Button the vest either before or after the inflation, and the preserver is thus securely fastened to the body of the wearer. The preserver can be as readily withdrawn from the garment as applied to it, and then the garment can be worn without it.

By this means no special garment need be used or carried about, which is useless, except in times of danger. My form and construction of air bags or pads can be in a moment applied to any vest, and that too without disturbing any of its seams or in any manner affecting its use as a garment in general when the life-preserver is not needed. When the bags are inflated and on the body of the user, the tube C may be tucked back through its slot and be out of sight. Its length and pendency when in water is advantageous, for when the mouth-piece *c* is (as might happen) not fully closed, still the air will not escape against the pressure of the water in which it hangs.

Having thus fully described my invention, what I claim therein is—

1. An air-tight bag or pad that may be introduced or removed from between the face and lining of a vest or other similar garment at pleasure without disturbing any of the seams of said garment or impairing its utility as a garment to be worn without said bag or pad, substantially as described.

2. In combination with an air bag or pad to be applied to vests or other garments, the tube or channel C, when said tube or channel is formed by a continuation of the sides or walls of the bag or pad, and without a seam or other artificial connection or union therewith, substantially as described, and for the purpose mentioned.

RICHARD L. NELSON.

Witnesses:

A. B. STOUGHTON,

THOS. H. UPPERMAN.